United States Patent
Mouch et al.

(10) Patent No.: US 9,988,103 B1
(45) Date of Patent: Jun. 5, 2018

(54) TAILGATE ASSEMBLY AND METHOD FOR ACCESSING A CARGO BOX OF A PICKUP TRUCK HITCHED TO A TRAILER

(71) Applicant: FORD GLOBAL TECHNOLOGIES, LLC, Dearborn, MI (US)

(72) Inventors: Tim Alan Mouch, Saline, MI (US); Jeffrey Ronald Bohmer, Monroe, MI (US); Sino Johan Van Dyk, Plymouth, MI (US); William Edward Draper, III, Canton, MI (US); Jay Curtiss Griffith, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/458,657

(22) Filed: Mar. 14, 2017

(51) Int. Cl.
*B62D 33/027* (2006.01)
*B62D 33/033* (2006.01)

(52) U.S. Cl.
CPC ....... *B62D 33/0273* (2013.01); *B62D 33/033* (2013.01)

(58) Field of Classification Search
CPC ... B62D 33/0273; B62D 33/03; B62D 33/033
USPC ....................................... 296/57.1
See application file for complete search history.

(56) References Cited

U.S. PATENT DOCUMENTS

| | | | |
|---|---|---|---|
| 3,027,188 A | 3/1962 | Eichstadt et al. | |
| 4,861,093 A | 8/1989 | Chapman | |
| 5,110,172 A | 5/1992 | Ney et al. | |
| 5,711,569 A | 1/1998 | Sovoda | |
| 5,853,116 A * | 12/1998 | Schreiner | B60R 9/00 220/4.29 |
| 5,931,519 A * | 8/1999 | Jeffers | B60P 3/36 280/423.1 |
| 6,276,738 B1 | 8/2001 | Marshall | |
| 6,293,602 B1 | 9/2001 | Presley | |
| 6,364,392 B1 * | 4/2002 | Meinke | B60P 3/40 296/26.1 |
| 6,447,238 B1 | 9/2002 | Brown | |
| 6,749,246 B2 * | 6/2004 | Landwehr | B60P 1/435 296/61 |
| 6,779,824 B1 * | 8/2004 | Lazarevich | B60P 1/003 296/37.6 |
| 6,905,157 B2 * | 6/2005 | Kang | B62D 33/0273 296/55 |
| 6,918,624 B2 * | 7/2005 | Miller | B60P 3/40 182/127 |
| 7,607,711 B2 | 10/2009 | Marshall | |
| 7,658,427 B2 * | 2/2010 | Patton, Jr. | B62D 21/15 293/117 |
| 7,712,811 B2 * | 5/2010 | Heaman | B62D 33/0273 296/26.08 |

(Continued)

*Primary Examiner* — Gregory A Blankenship
(74) *Attorney, Agent, or Firm* — Jason Rogers; King & Schickli, PLLC

(57) ABSTRACT

A method is provided for lowering a tailgate of a motor vehicle when that motor vehicle is hitched to a trailer having a component that interferes with the lowering of the tailgate. The method comprises the steps of displacing a section of the tailgate to form a clearance opening in the tailgate, folding the tailgate into a lowered position and accommodating the component of the trailer in the clearance opening when the tailgate is folded and lowered. Various tailgate assemblies for performing the method are also disclosed.

3 Claims, 15 Drawing Sheets

(56) References Cited

U.S. PATENT DOCUMENTS

| | | | |
|---|---|---|---|
| 8,201,869 B1 * | 6/2012 | Butlin, Jr. | B60R 3/02 |
| | | | 296/57.1 |
| 8,342,590 B1 | 1/2013 | Richburg | |
| 8,348,325 B2 | 1/2013 | Hausler et al. | |
| 9,463,746 B2 * | 10/2016 | Butlin, Jr. | B60R 3/02 |
| 2001/0004155 A1 * | 6/2001 | Decker | B60J 5/103 |
| | | | 296/57.1 |
| 2005/0093327 A1 * | 5/2005 | Bruford | B60P 3/40 |
| | | | 296/57.1 |

* cited by examiner

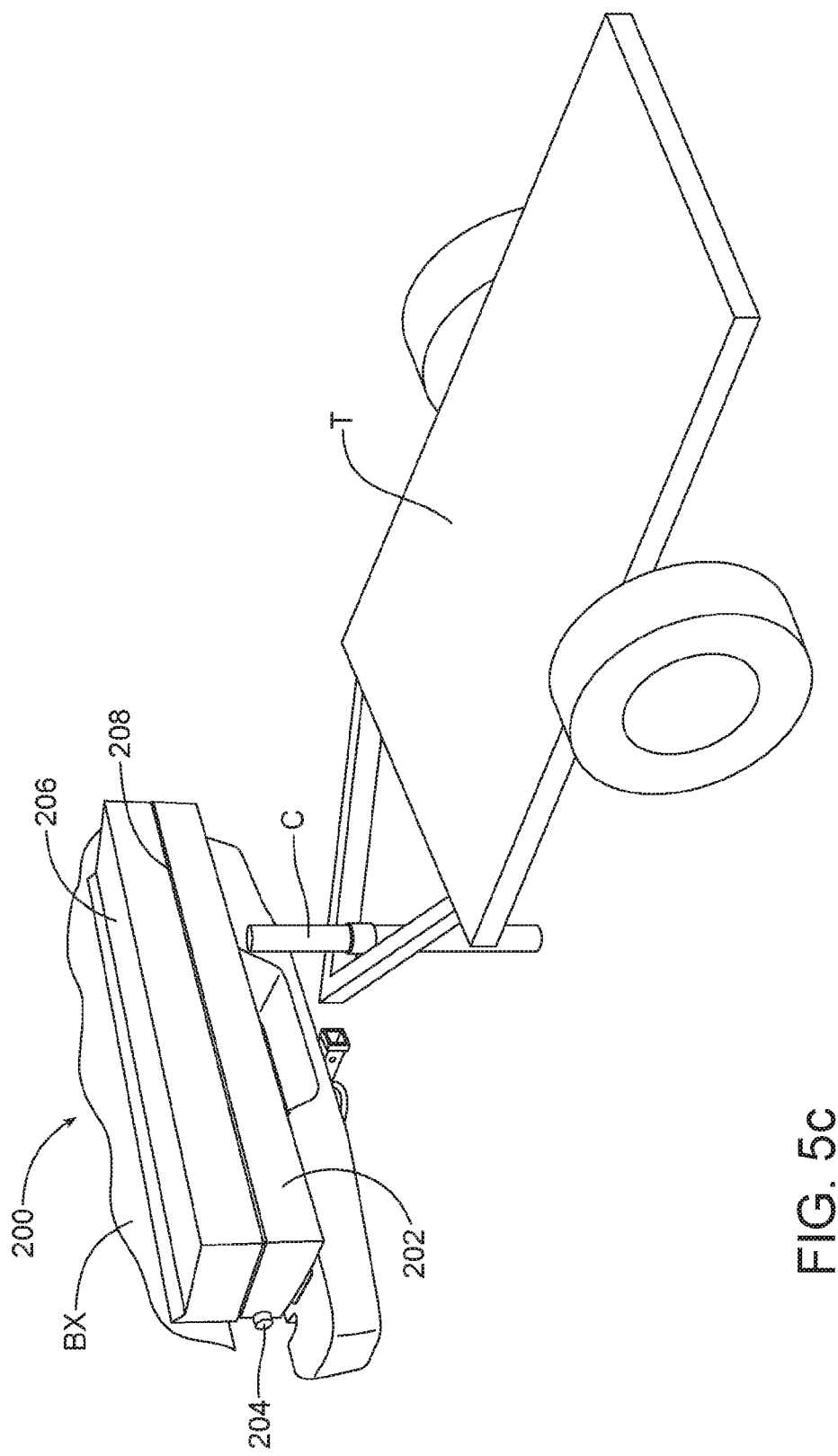

TAILGATE ASSEMBLY AND METHOD FOR ACCESSING A CARGO BOX OF A PICKUP TRUCK HITCHED TO A TRAILER

TECHNICAL FIELD

This document relates generally to the motor vehicle equipment field and, more particularly, to a new and improved tailgate assembly and related method allowing one to lower the tailgate when the motor vehicle is hitched to a trailer in order to gain easier access to the cargo box of the motor vehicle.

BACKGROUND

When a pickup truck is hitched to a trailer for towing, access to the cargo box of the pickup truck is often compromised because the tailgate cannot be fully lowered due to interference with a component of the trailer such as the trailer jack post or other trailer hardware. In such a situation, access to the cargo box of the towing motor vehicle is gained only by lifting items over the tailgate or the cargo box sidewall. Significantly, this requires lifting of potentially heavy materials to a greater height when loading the cargo box substantially increasing the energy, work and effort required.

This document relates to a new and improved tailgate assembly and the related method that allows the lowering of a tailgate even when a motor vehicle is hitched to a trailer thereby greatly improving access to the cargo box of the towing motor vehicle.

SUMMARY

In accordance with the purposes and benefits described herein, a new and improved method is provided for lowering a tailgate on a motor vehicle when that motor vehicle is hitched to a trailer. That method comprises the steps of displacing a section of the tailgate to form a clearance opening in the tailgate, folding the tailgate into a lowered position and accommodating a component of the trailer in the clearance opening when the tailgate is folded and lowered.

In some of the many possible embodiments, the method includes the step of pivoting the section away from the trailer. In some of the many possible embodiments, the method includes the step of withdrawing the section from the tailgate. In some of the many possible embodiments, the method includes the step of sliding the section of the tailgate laterally. More specifically, in some of those embodiments, the method includes sliding the section laterally into an internal compartment in an adjacent portion of the tailgate. In some alternative embodiments, the method includes sliding the section laterally so as to overlie an adjacent portion of the tailgate.

In accordance with an additional aspect, a tailgate assembly is provided. That tailgate assembly comprises a main body including a receiver and a removable section including a connector received and held in the receiver when the removable section is attached to the main body.

The tailgate assembly may also include a locking feature releasably securing the removable section to the main body. In some embodiments the receiver may comprise two sockets and the connector may comprise two projecting pins received in those two sockets.

In accordance with yet another aspect, a tailgate assembly comprises a main body having a forward face and a rearward face when closed and a flip section connected to the main body by a hinge whereby the flip section may be folded forward over the forward face. The main body may include a clearance opening and the flip section may close the clearance opening when in the home position. Further, the tailgate assembly may include a locking feature releasably securing the flip section in the home position.

In some of the many possible embodiments, the flip section may extend completely across the main body and be displaceable between a home position coplanar with the main body and a folded position lying flat against the main body. Further, a locking feature may be provided to releasably secure the flip section in the home position.

In accordance with yet another aspect, a tailgate assembly comprises a main body including a clearance opening, a guideway and a tailgate section displaceable along the guideway between a closed position closing the clearance opening and an open position opening the clearance opening. The main body may include an internal compartment and the tailgate section may slide into the internal compartment when in the open position. In other alternative embodiments, the tailgate section may include a receiver and the tailgate section may slide and nest over a portion of the main body when in the open position.

In the following description, there are shown and described several preferred embodiments of the method and various tailgate assemblies for performing that method. As it should be realized, the method and tailgate assemblies are capable of other, different embodiments and their several details are capable of modification in various, obvious aspects all without departing from the method and tailgate assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the method and various tailgate assemblies for performing that method and together with the description serve to explain certain principles thereof.

FIGS. 5a-5c are a series of views illustrating how a fifth embodiment of a tailgate assembly may be utilized in a method of lowering a tailgate of a motor vehicle when that motor vehicle is hitched to a trailer.

Figure 1A:
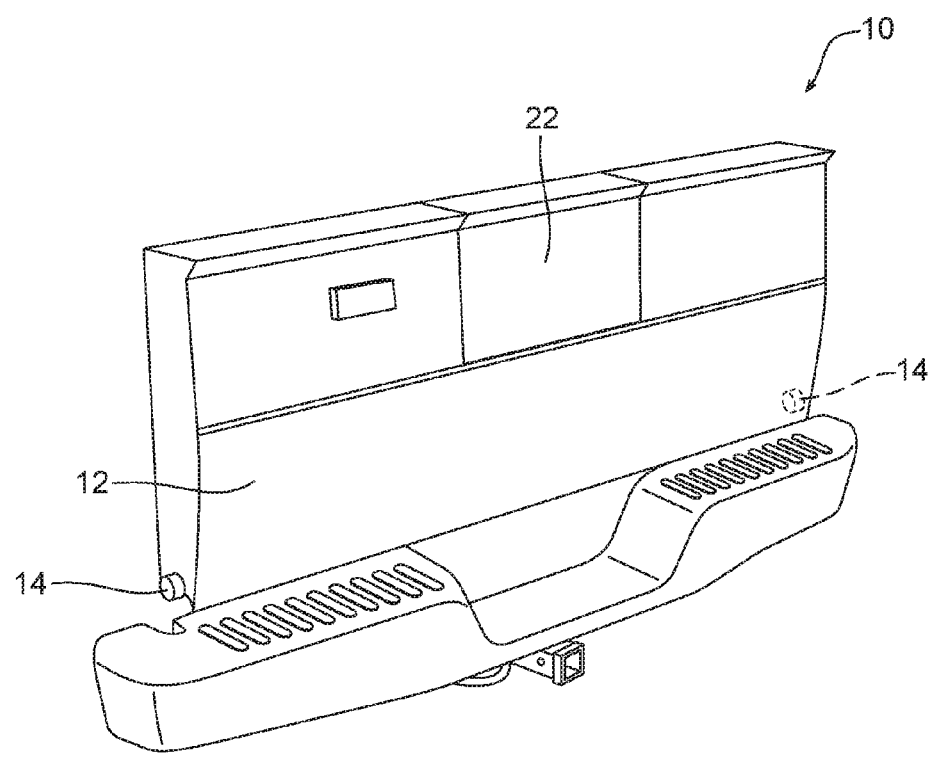
FIGS. 1a-1c are a series of views illustrating how a first embodiment of a tailgate assembly may be utilized in a method of lowering a tailgate on a motor vehicle when that motor vehicle is hitched to a trailer.

Reference will now be made in detail to the present preferred embodiments of the method and the various tailgate assemblies performing that method, examples of which are illustrated in the accompanying drawing figures.

DETAILED DESCRIPTION

This document relates to a new and improved method of lowering a tailgate (note main body 12 in FIGS. 1a-1c, main body 52 in FIGS. 2a-2c, main body 102 in FIGS. 3a-3c, main body 152 in FIGS. 4a-4c and main body 202 in FIGS. 5a-5c) on a motor vehicle, such as a pickup truck, when that motor vehicle is hitched to a trailer T for purposes of towing. Advantageously, the method provides enhanced access to the cargo box BX of the motor vehicle that would not otherwise be available due to a component of the trailer T, interfering with the opening of the tailgate.

The method may be broadly described as including the steps of: (a) displacing a section (note section 22 in FIGS. 1a-1c, section 56 in FIGS. 2a-2c, section 108 in FIGS. 3a-3c, section 162 in FIGS. 4a-4c and section 206 in FIGS. 5a-5c) of the tailgate to form a clearance opening in the tailgate, (b) folding the tailgate into a lowered position and (c) accommodating a component of the trailer T that would otherwise interfere with the lowering of the tailgate in the clearance opening when the tailgate is folded and lowered.

Figure 1B:
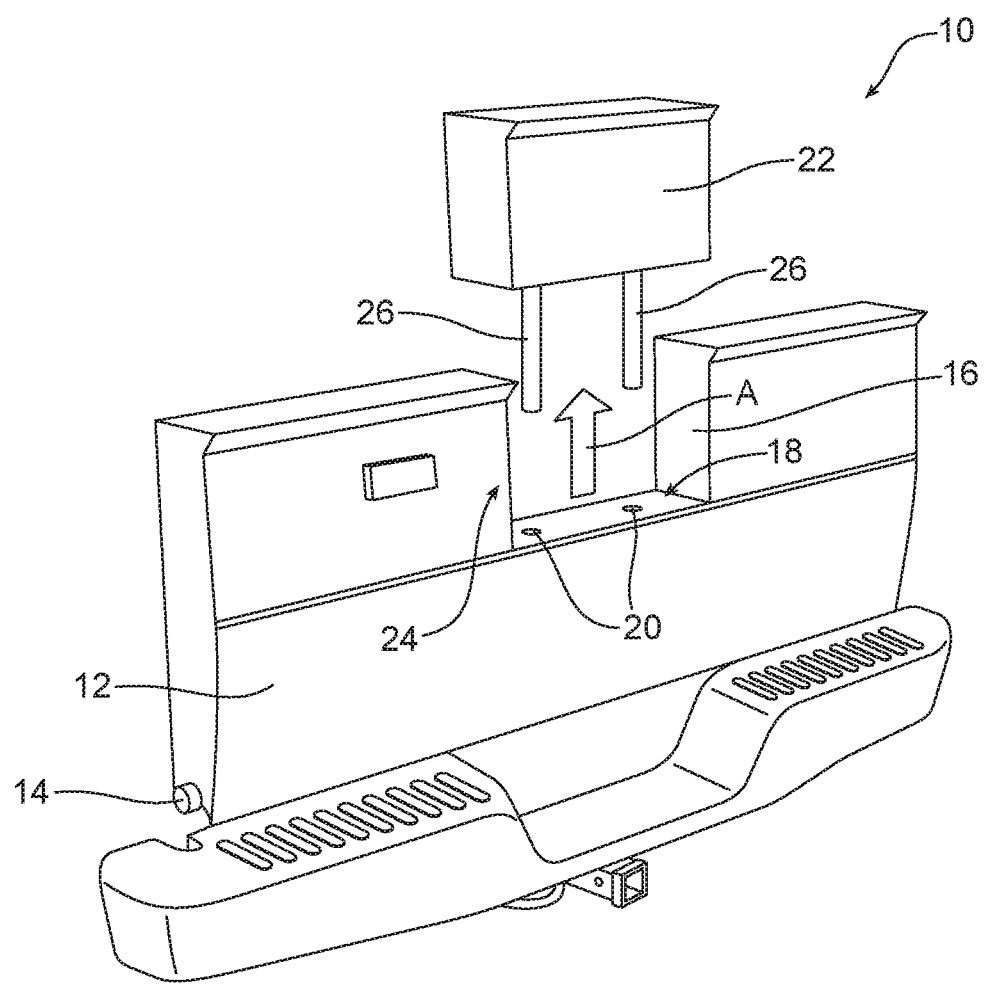
Figure 1C:
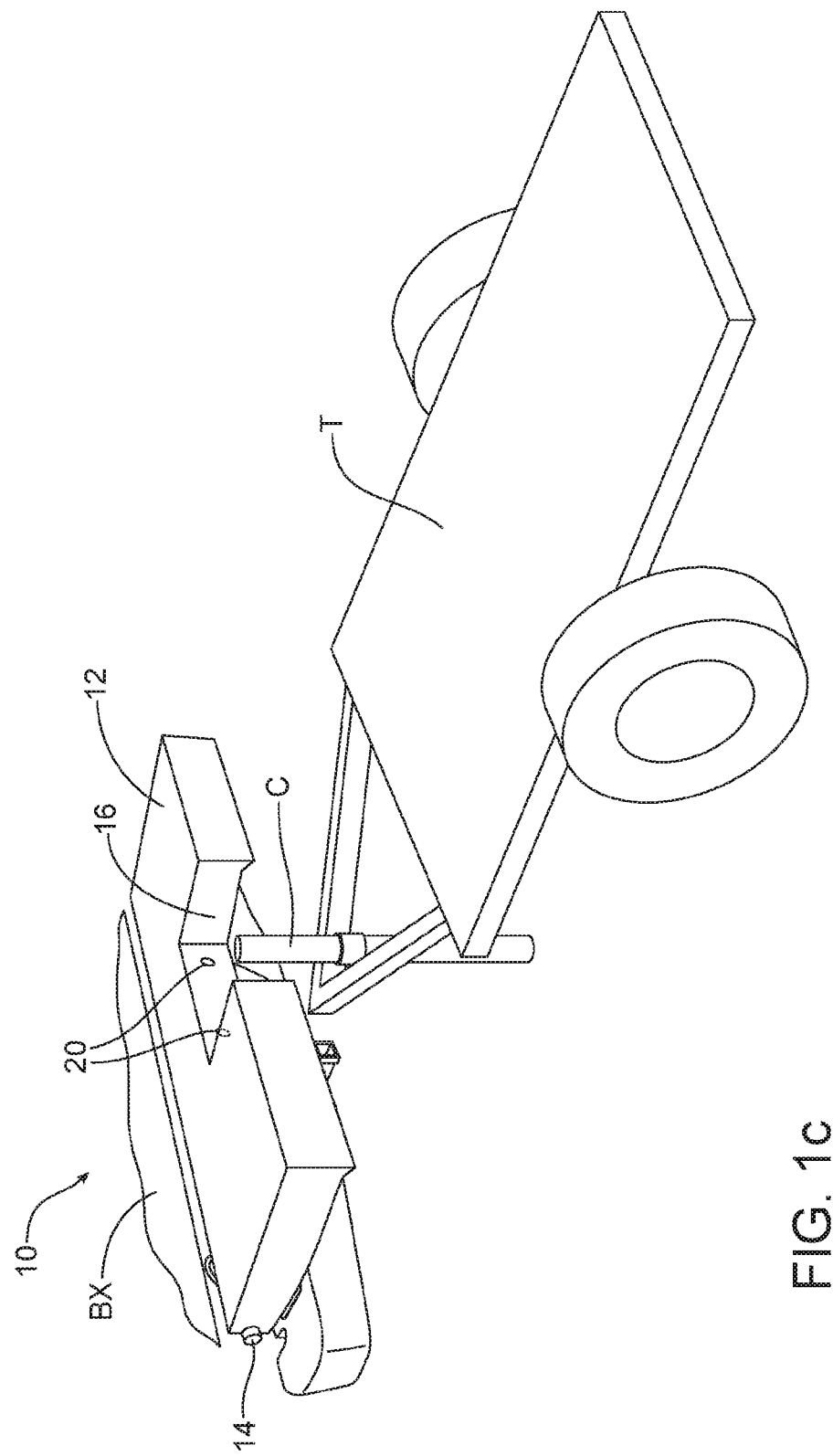
Figure 2A:
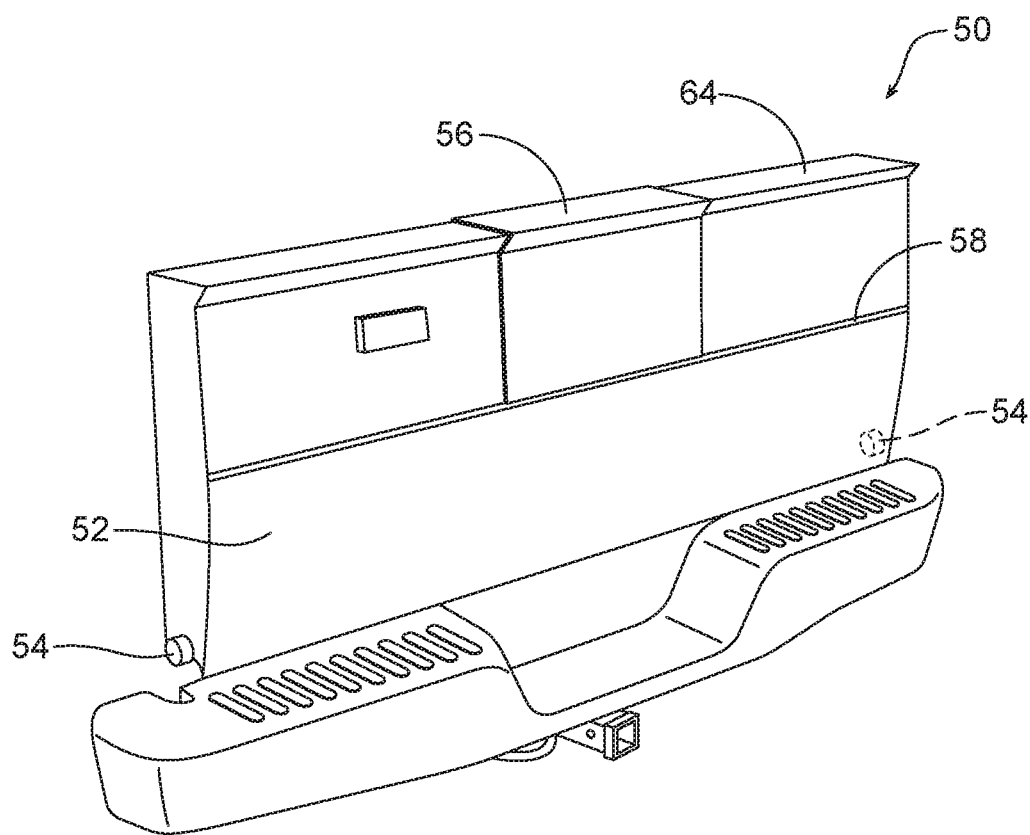
FIGS. 2a-2c are a series of views illustrating how a second embodiment of a tailgate assembly may be utilized in a method of lowering a tailgate on a motor vehicle when that motor vehicle is hitched to a trailer.
Figure 2B:
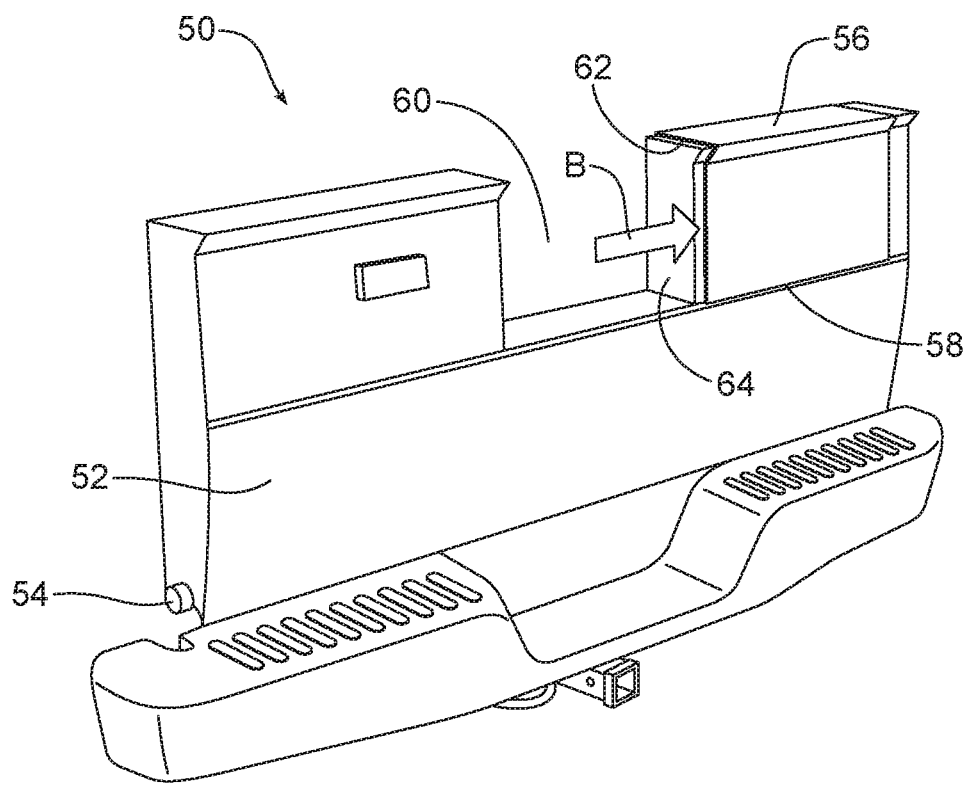
Figure 2C:
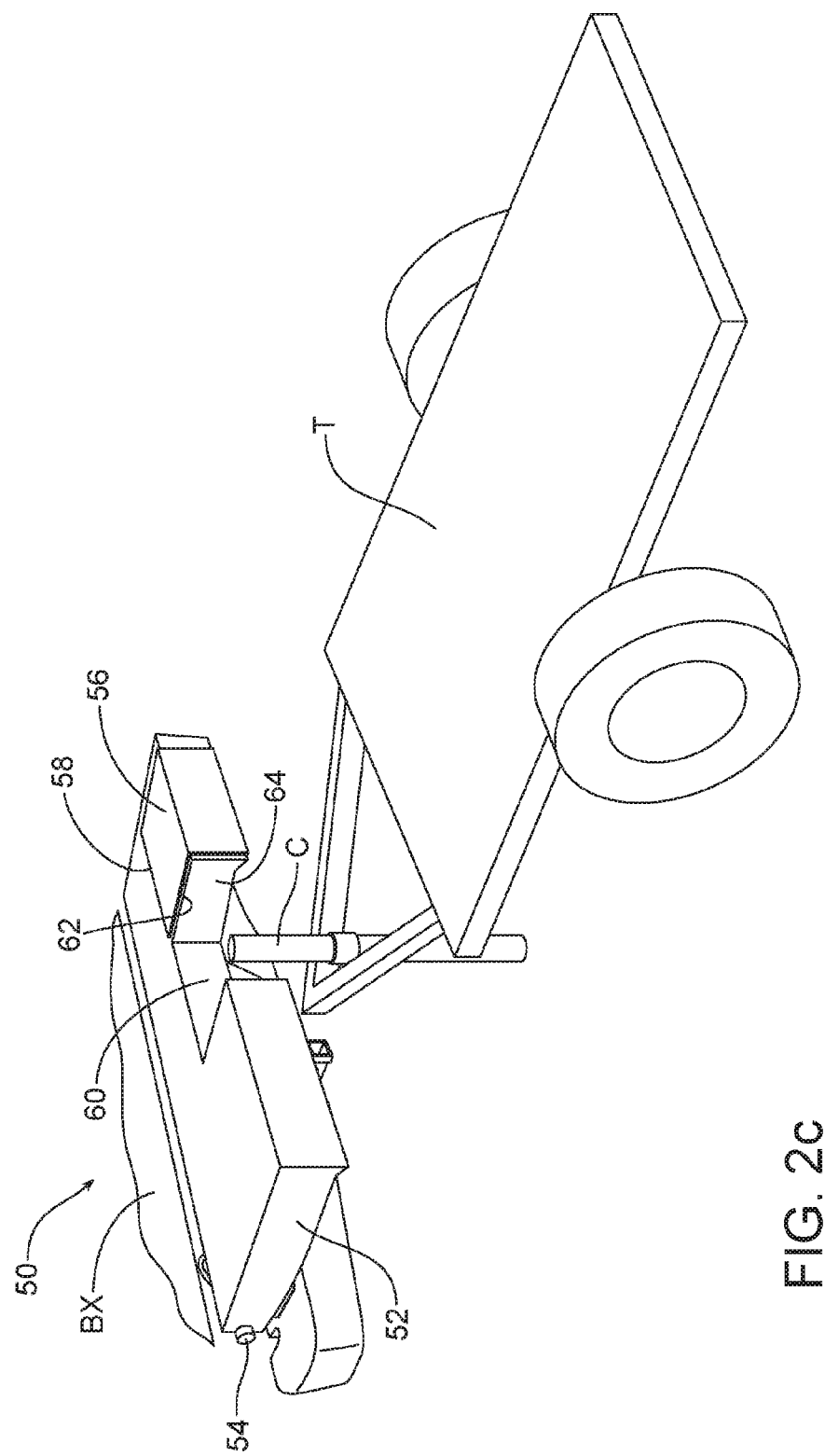

In some embodiments such as illustrated in FIGS. 1a-1c, the method may include withdrawing the section 22 from the tailgate. In other embodiments such as illustrated in FIGS. 2a-2c, the method may include the step of sliding the section of the tailgate laterally and, more particularly, sliding the section 56 of the tailgate laterally so as to overlie an adjacent portion 64 of the tailgate.

Figure 3A:
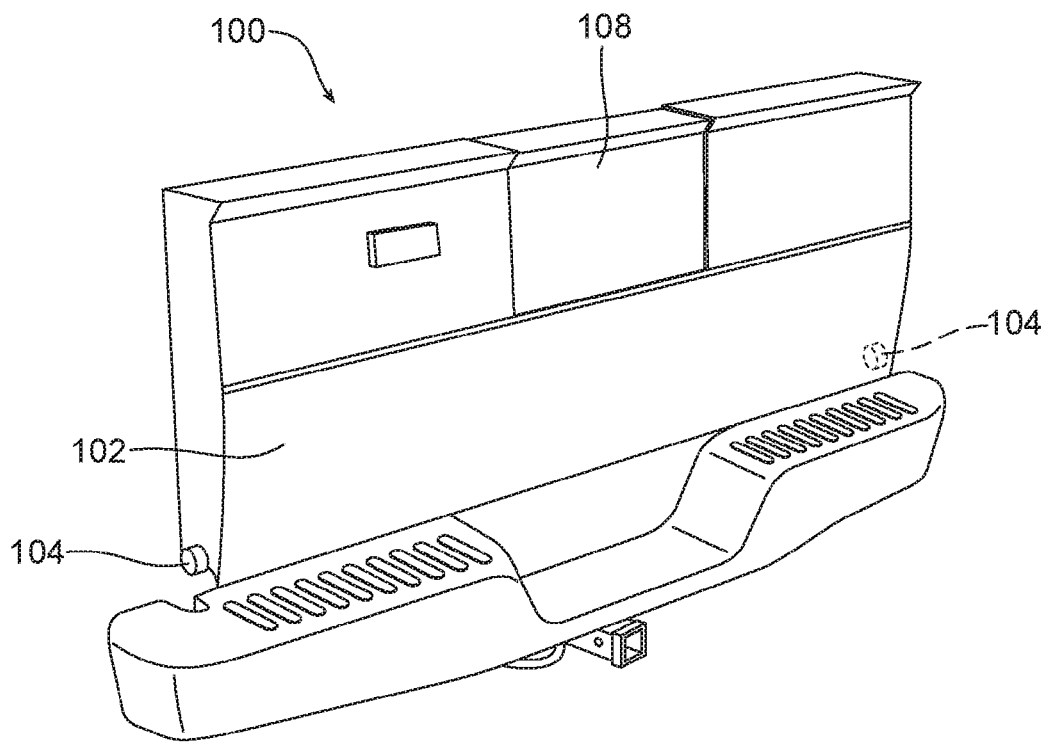
FIGS. 3a-3c are a series of views illustrating how a third embodiment of a tailgate assembly may be utilized in a method of lowering a tailgate on a motor vehicle when that motor vehicle is hitched to a trailer.
Figure 3B:
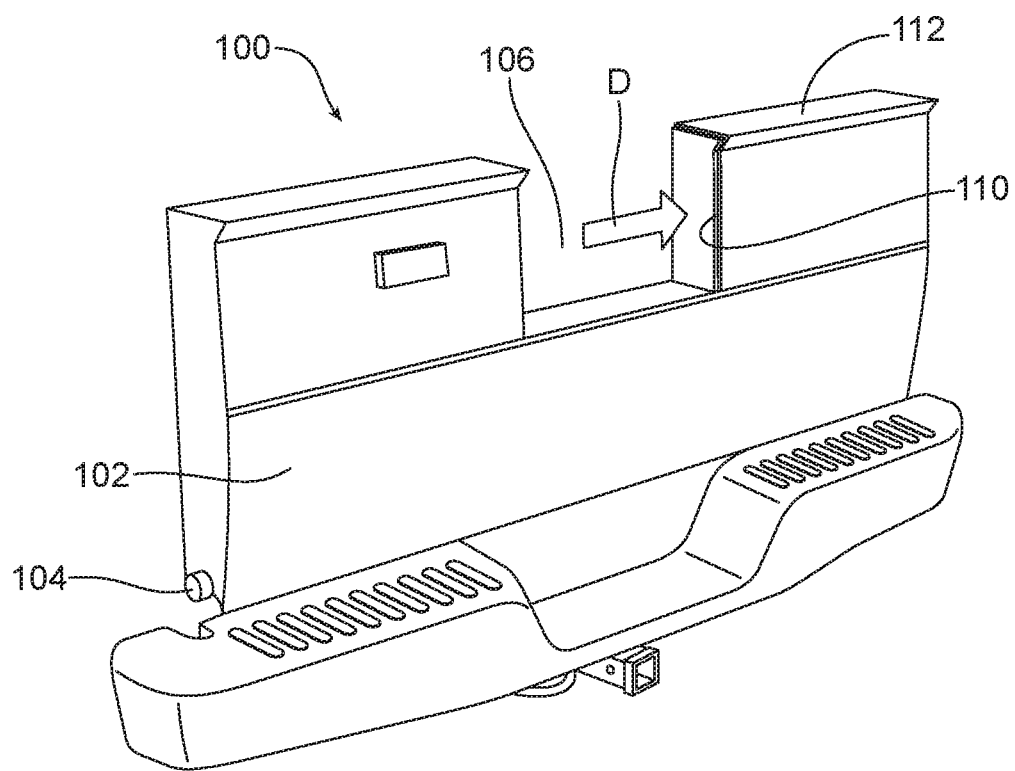
Figure 3C:
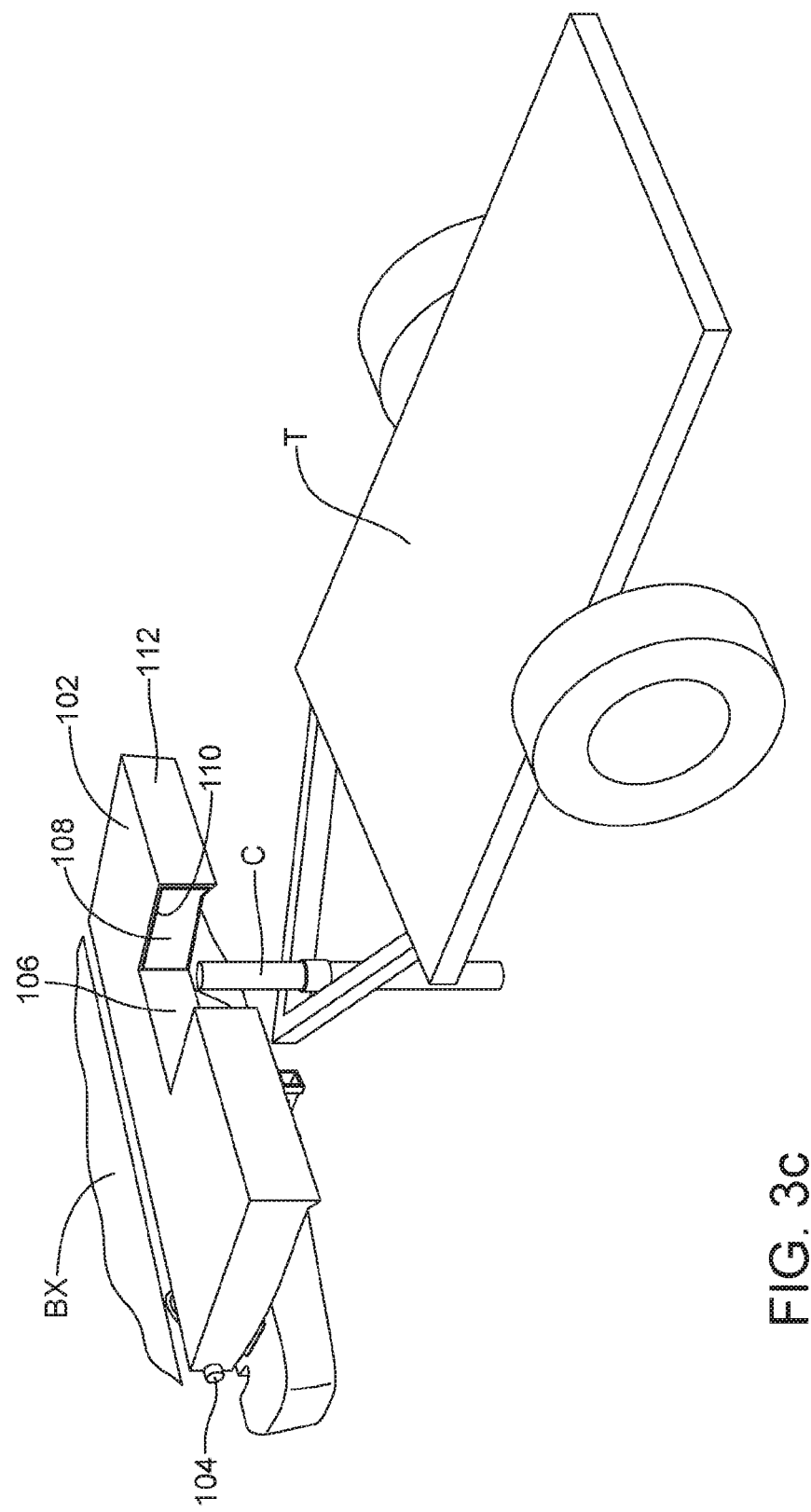

In other embodiments, such as illustrated in FIGS. 3a-3c, the method may include the step of sliding the section 108 laterally into an internal compartment 110 in an adjacent portion 112 of the tailgate.

Figure 4A:
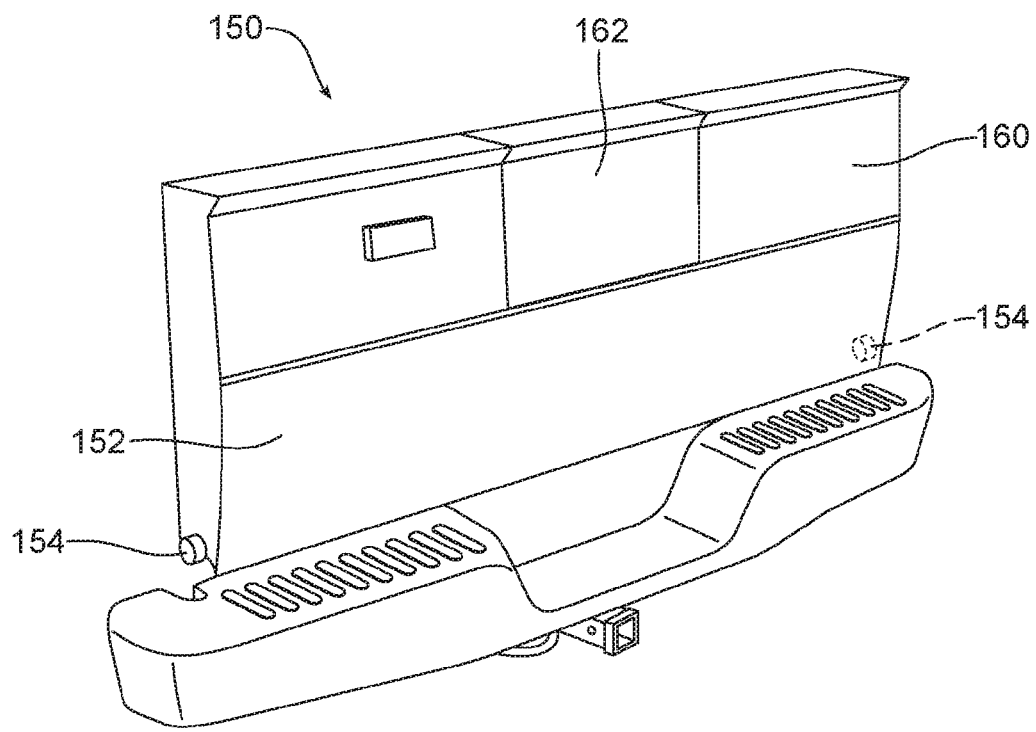
FIGS. 4a-4c are a series of views illustrating how a fourth embodiment of a tailgate assembly may be utilized in a method of lowering a tailgate on a motor vehicle when that motor vehicle is hitched to a trailer.
Figure 4B:
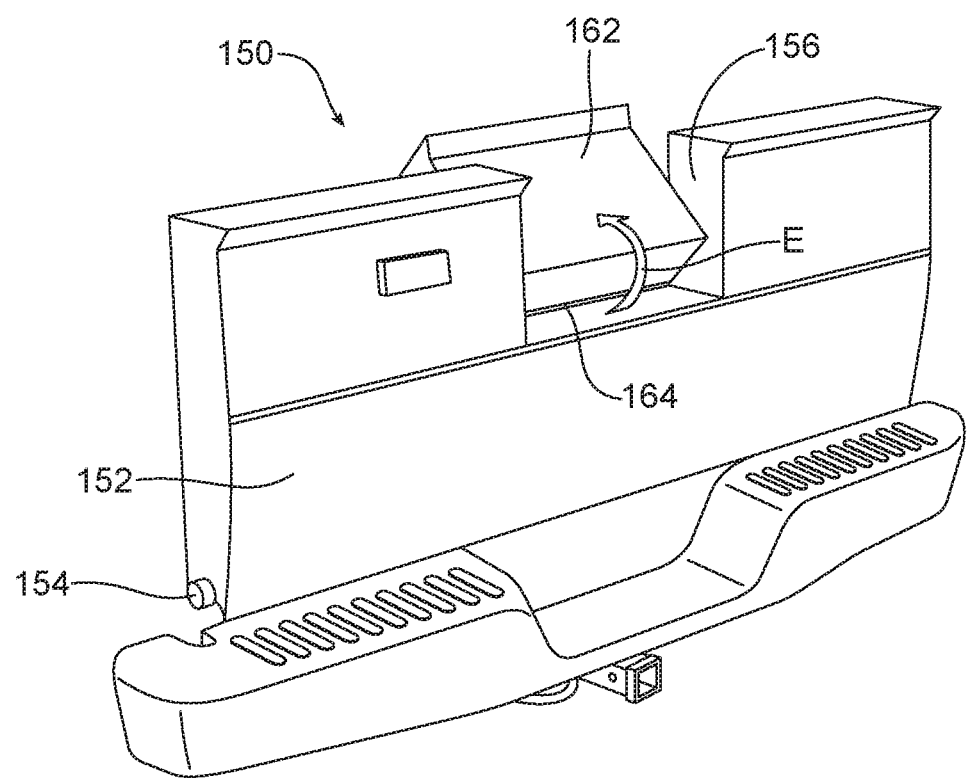
Figure 4C:
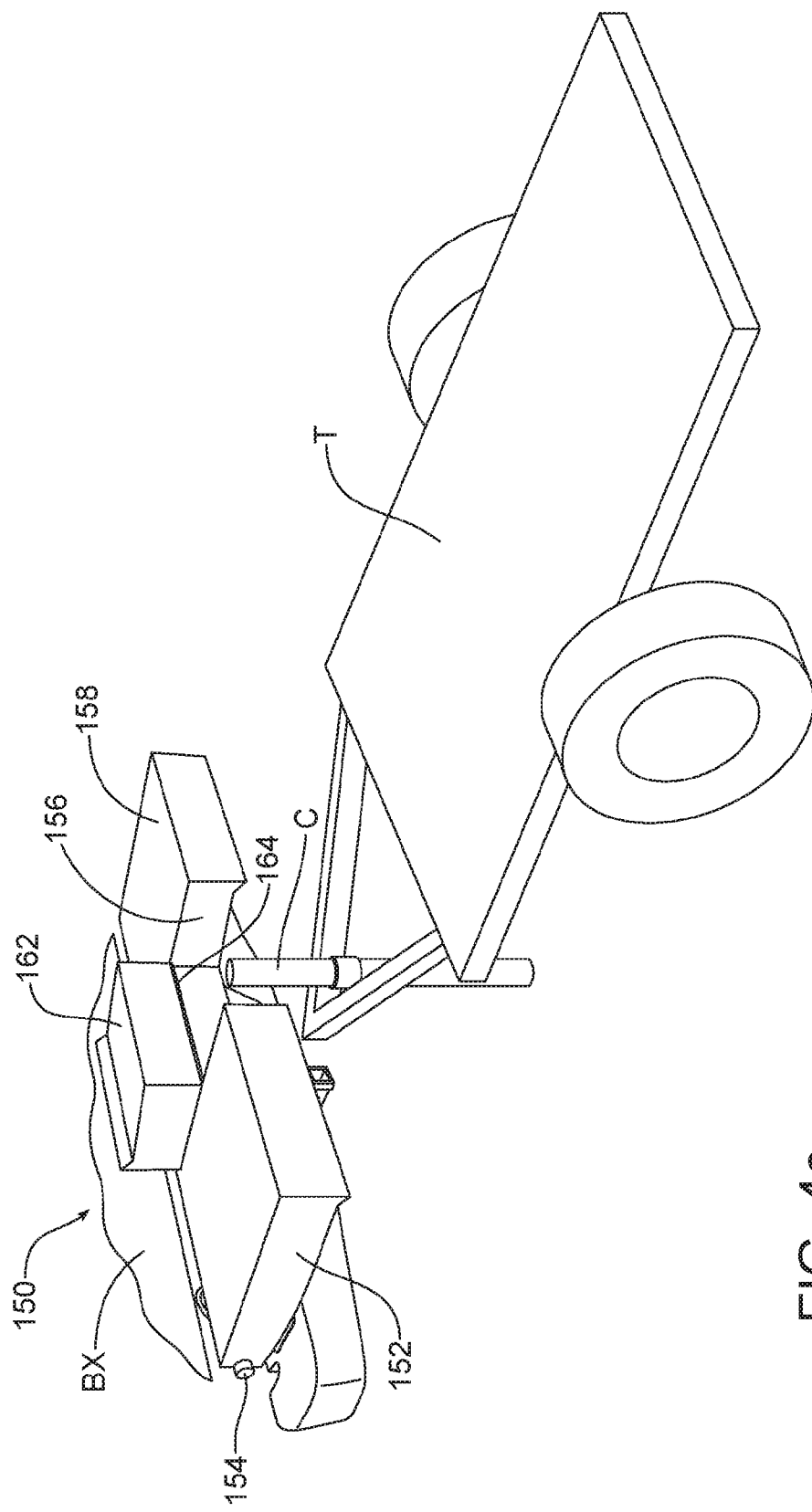
Figure 5A:
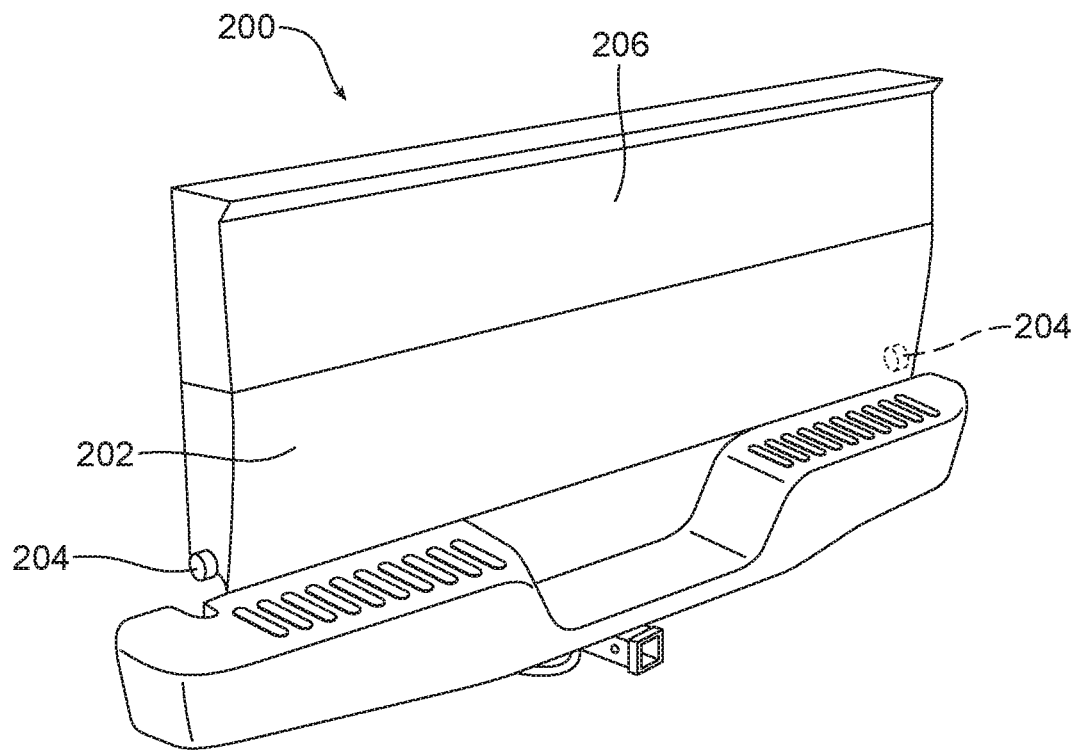
Figure 5B:
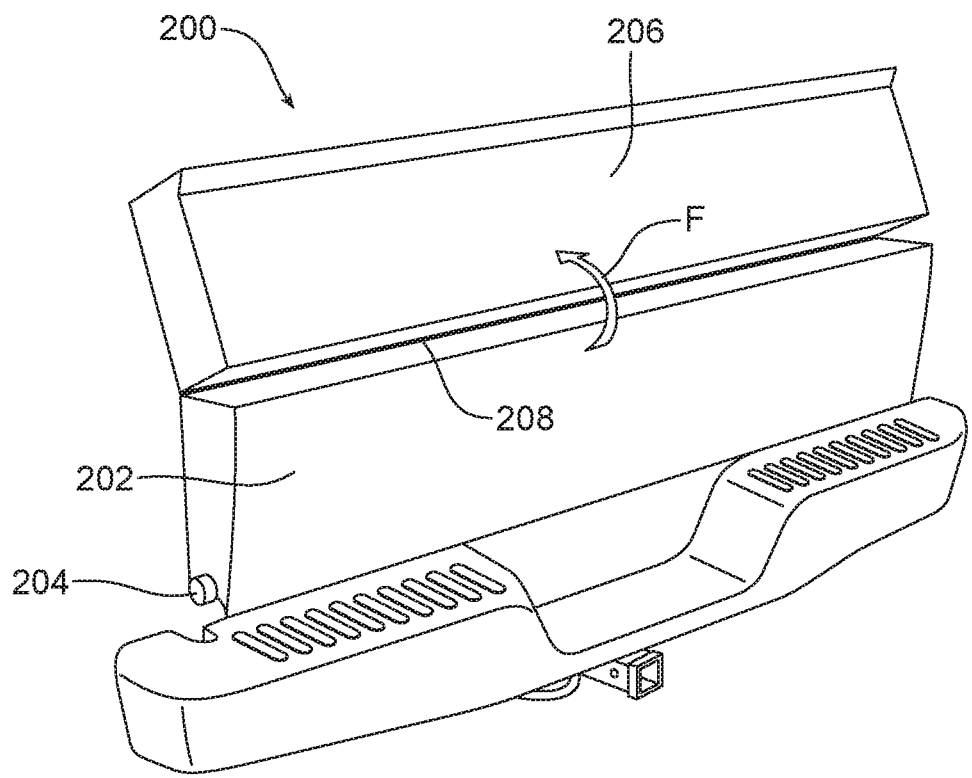

In still other embodiments as illustrated in FIGS. 4a-4c, the method may include pivoting the section 162 away from the trailer T so as to provide a clearance opening 156 to accommodate the trailer component C that would otherwise interfere with the opening of the tailgate. As illustrated in FIGS. 4a-4c, that section 162 may be pivoted forward to provide a clearance opening in the tailgate. In another possible embodiment as illustrated in FIGS. 5a-5c, the pivoting section 206 may extend all the way across the tailgate.

Reference is now made to FIGS. 1a-1c, illustrating a first possible embodiment of a tailgate assembly 10 for accomplishing or performing the method. As illustrated in FIGS. 1a-1c, the tailgate assembly 10 includes a main body 12 having two opposed hinge pins 14. The main body 12 also includes a clearance opening 16 and a receiver 18. In the illustrated embodiment, the receiver 18 comprises two sockets 20.

As further illustrated in FIGS. 1a-1c, the tailgate assembly 10 also includes a removable section 22. Removable section 22 includes a connector 24 that is received and held in the receiver 18 when the removable section is attached to the main body 12 in order to close the clearance opening 16. As illustrated in FIG. 1b, in the illustrated embodiment the connector 24 comprises two projecting pins 26 that are complementary to and receivable within the two sockets 20. A locking feature (not shown) of a type known in the art is utilized to secure the removable section 22 in the clearance opening 16 when the removable section is connected to the main body 12 and held in a home position (see FIG. 1a). The locking feature may comprise a spring loaded plunger carried on the main body 12 that engages in detent notches on the projecting pins 26 similar in concept to the releasable locking mechanism often used to secure a head rest to a motor vehicle seat.

When one wishes to lower the tailgate assembly 10 with the motor vehicle hitched to a trailer T, one first unlatches the locking feature. One then removes or withdraws the removable section 22 from the main body 12. More specifically, one lifts the removable section 22 in the direction of action arrow A, pulling the two pins 26 from the two sockets 20 (see FIG. 1b). Next, the individual lowers the main body 12 of the tailgate assembly 10 by pivoting that main body about the hinge pins 14. As illustrated in FIG. 1c, the clearance opening 16 in the main body 12 accommodates the component C of the trailer T that would otherwise interfere with the opening of the tailgate assembly 10 if it were not for the clearance provided by the clearance opening 16. In FIG. 1c illustration, the component C is a trailer jack. The lowered tailgate assembly 10 allows easier access to the cargo box BX of the motor vehicle.

Reference is now made to FIGS. 2a-2c illustrating a second embodiment of the tailgate assembly 50. The tailgate assembly 50 includes a main body 52 including opposed hinge pins 54. The tailgate assembly 50 also includes a tailgate section 56 that is displaceable along a guideway 58 (such as two opposed elongated slots in the opposite sides of the main body 52) between a closed position closing the clearance opening 60 in the main body 52 (see FIG. 2a) and an open position opening the clearance opening (see FIG. 2b). As should be appreciated, the tailgate section 56 includes a substantially U-shaped opening or receiver 62 and the tailgate section 56 nests over a portion 64 of the main body 52 when in the open position. A locking feature (not shown) secures the tailgate section 56 in at least the closed position. That locking feature may comprise, for example, a spring loaded post or pin.

When one wishes to lower the tailgate assembly 50 on a motor vehicle hitched to a trailer T, one slides the tailgate section 56 laterally in the direction of action arrow B (see FIG. 2b) along the guideway 58 so that the adjacent portion 64 of the main body 52 passes into the receiver 62 leaving the tailgate section 56 overlying and nesting over that portion. This opens the clearance opening 60. The tailgate assembly 50 is then lowered by pivoting on the hinge pins 54 with the clearance opening 60 accommodating the component C of the trailer T when the tailgate assembly 50 is folded and fully lowered (see FIG. 2c). The lowered tailgate assembly 50 allows easier access to the cargo box BX.

Reference is now made to FIGS. 3a-3c illustrating a third possible embodiment of tailgate assembly 100. The tailgate assembly 100 includes a main body 102 having a pair of opposed hinge pins 104 and a clearance opening 106.

The tailgate assembly 100 also includes a tailgate section 108. When in the home position, the tailgate section 108 closes the clearance opening 106 (see FIG. 3a). When in the open position, the tailgate section 108 slides into an internal compartment 110 provided in the main body 102 (see FIG. 3b).

When one wishes to lower the tailgate assembly 100 on a motor vehicle hitched to a trailer T, one must first unlatch any locking feature such as a spring loaded post or pin (not shown). Next, one slides the tailgate section 108 laterally in the direction of action arrow D so that the tailgate section 108 is displaced from the closed position, closing the clearance opening 106, (illustrated in FIG. 3a) to the open position opening the clearance opening 106 as illustrated in FIG. 3b. Next, the individual lowers the tailgate assembly 100 by pivoting the tailgate about the opposed hinge pins 104. As this is done, the clearance opening 106 accommodates the component C of the trailer T allowing the tailgate assembly 100 to be fully opened for an enhanced access to the cargo box BX of the motor vehicle.

Reference is now made to FIGS. 4a-4c illustrating a fourth embodiment of tailgate assembly 150. That tailgate assembly 150 includes a main body 152 having a pair of opposed hinge pins 154 and a clearance opening 156. The tailgate assembly 150 also includes a forward face 158 and a rearward face 160 when the tailgate is in the closed position illustrated in FIG. 4a.

The tailgate assembly 150 also includes a flip section 162 that is displaceable between the closed position, closing the clearance opening 156 as illustrated in FIG. 4a and a fully flipped position resting flat against the forward face 158 of the main body 152 as illustrated in FIG. 4c. More specifically, as illustrated in FIG. 4b, the flip section 162 is attached to the main body 152 and pivots about the hinge 164. A locking feature, such as a sliding tab (not shown) allows one to secure the flip section 162 in at least the closed position.

When one wishes to lower the tailgate assembly 150 when the motor vehicle to which that tailgate assembly is attached is hitched to a trailer T, one first unlatches the locking feature. Next, one pivots the flip section 162 forward, away from the trailer T in the direction of action arrow E (see FIG. 4b) until the flip section 162 rests flat against the forward face 158 of the main body 152 with the clearance opening 156 completely open. The individual folds and lowers the tailgate assembly 150 by pivoting about the hinge pins 154. As the tailgate assembly 150 is folded and lowered, the clearance opening 156 accommodates the component C of the trailer that would otherwise interfere with the opening of the tailgate assembly 150 in order to better access the cargo box BX of the motor vehicle.

Reference is now made to FIGS. 5a-5c illustrating a fifth embodiment of tailgate assembly 200. The tailgate assembly 200 includes a main body 202 including a pair of opposed pivot pins 204 about which the tailgate assembly is pivoted with respect to the motor vehicle. The tailgate assembly 200 also includes a flip section 206 connected by means of a hinge 208 to the main body 202. In the illustrated embodiment, the flip section 206 extends completely across the main body 202. A locking feature, such as a sliding tab (not shown) is provided to lock the flip section 206 in at least the closed position illustrated in FIG. 5a wherein the flip section 206 is coplanar with the main body 202.

When one wishes to open the tailgate assembly 200 when the motor vehicle to which it is attached is connected to a trailer T, one first unlatches the locking feature. Next, one pivots the flip section 206 in the direction of action arrow F forward, about the hinge 208 and away from the trailer T. See FIG. 5b. When fully flipped, the flip section 206 rests flat against the forward face of the main body 202.

The individual then folds the tailgate assembly 202 down about the hinge pins 204 into the fully lowered position. As this is done, clearance opening or space provided by the folded flip section 206 accommodates the component C of the trailer T so as to eliminate any interference with the component and thereby allow full opening of the tailgate assembly 200 for better access to the cargo box BX of the towing vehicle.

The various embodiments of tailgate assembly, 10, 50, 100, 150, 200 illustrated in the drawing figures allow an individual to fully lower the tailgate assemblies in situations where a component C, such as a trailer jack, of the trailer T would otherwise interfere with the opening of a tailgate having a one-piece main body. Advantageously, the tailgate assemblies 10, 50, 100, 150, 200 allow one to more easily access the truck bed or cargo box BX of a motor vehicle even when that motor vehicle is hitched to a trailer T. Accordingly, all of the tailgate assemblies 10, 50, 100, 150, 200 provide a significant benefit and advantage and are useful in a method of lowering a tailgate when the motor vehicle to which the tailgate is attached is hitched to a trailer T.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A method of lowering a tailgate when hitched to a trailer, comprising:
   displacing a section of said tailgate to form a clearance opening in said tailgate by sliding said section of said tailgate laterally;
   folding said tailgate into a lowered position; and
   accommodating a component of said trailer in said clearance opening when said tailgate is folded and lowered.

2. The method of claim 1, including sliding said section laterally into an internal compartment in an adjacent portion of said tailgate.

3. The method of claim 1, including sliding said section laterally so as to overlie an adjacent portion of said tailgate.

\* \* \* \* \*